(No Model.)  2 Sheets—Sheet 1.

J. STEPHENSON
TRAM CAR DRAW HEAD.

No. 327,614. Patented Oct. 6, 1885.

Attest:
Coul. A. Cooper
H. E. Hansmann.

John Stephenson Inventor.

(No Model.)

2 Sheets—Sheet 2.

J. STEPHENSON
TRAM CAR DRAW HEAD.

No. 327,614. Patented Oct. 6, 1885.

Attest:
Cout. A. Cooper.
K. C. Hansmann.

John Stephenson, Inventor.

UNITED STATES PATENT OFFICE.

JOHN STEPHENSON, OF NEW YORK, N. Y.

TRAM-CAR DRAW-HEAD.

SPECIFICATION forming part of Letters Patent No. 327,614, dated October 6, 1885.

Application filed July 1, 1885. Serial No. 170,383. (No model.)

*To all whom it may concern:*

Be it known that I, JOHN STEPHENSON, a citizen of the United States, residing in the city, county, and State of New York, have invented certain new and useful Improvements in Tram-Car Draw-Heads, of which the following is a specification.

The popular mode of coupling horses to a tram-car is by means of a hook draw-head, because this affords a most speedy and convenient means for the driver to connect and disconnect the horses; but it is possible for the horses to get in such a position that the whiffletrees can be jerked off from the hook and the horses escape.

Whiffles may be secured on the hook by bolts or similar devices, but nothing which will consume time, especially in detaching, is admissible, for exigencies occur which require the driver to detach his horses instantaneously—as, for instance, failure of the brakes to hold the car on a downgrade or approach of runaway horses and vehicles, &c.

It is furthermore desirable that the draw-head bar should have the capacity to yield when the horses plunge in their work of starting the car, thus preventing an unpleasant jerk to passengers, and rendering available the momentum of the horses' weight already in motion to assist in starting the load.

As usually constructed, the back action of the sliding bar, when stopped by its shoulder contacting with the socket, produces an unpleasant clicking noise, especially when the car is running easily with traces nearly slack, because every forward step of the horse jerks the sliding bar, causing another recoil and click.

To avoid these objections I construct the coupling device as fully set forth hereinafter, and as shown in the accompanying drawings, in which—

Figure 1:
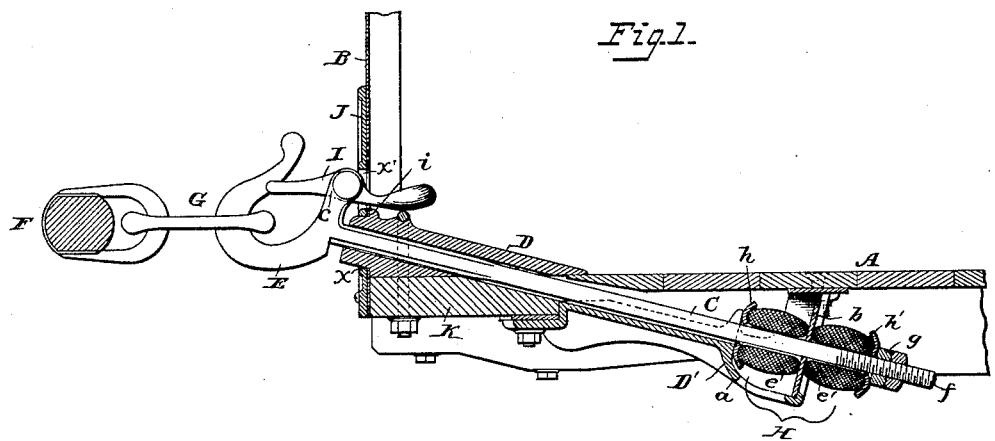
Figure 2:
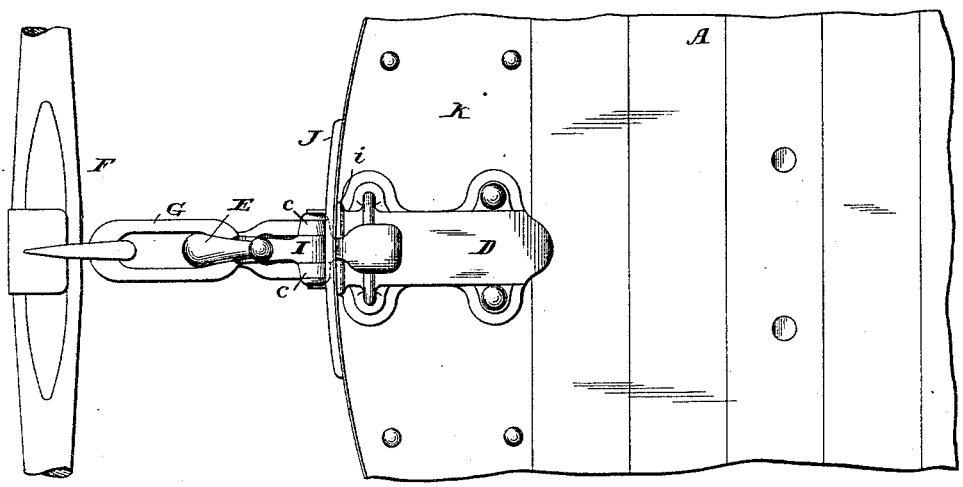
Figure 3:
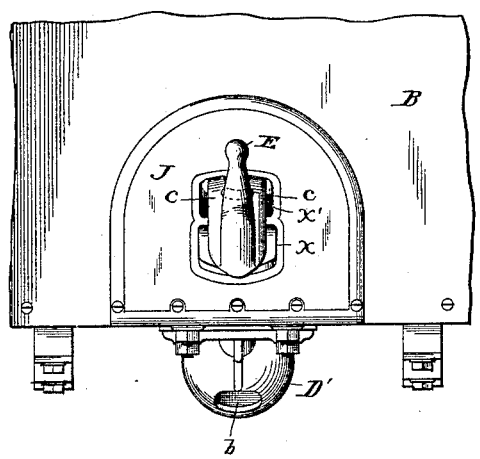
Figure 4:
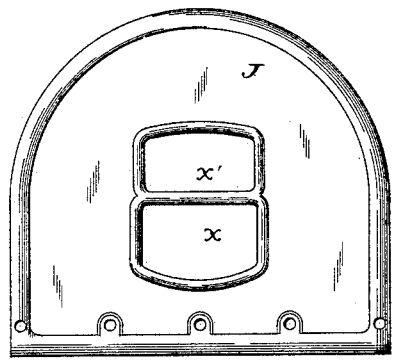

Figure 1 is a longitudinal sectional elevation showing the platform, draw-bar, and connections of a tram-car, and illustrating my improvements. Fig. 2 is a plan of Fig. 1. Fig. 3 is a front elevation. Fig. 4 is a face view of the shield.

A represents the usual platform; K, the nose-piece thereof; C, the draw-head bar; D D', the socket in which the bar slides, the part D' being enlarged to form a lodge, a, for the spring.

E is the draw-head hook; F, the whiffle; G, the link.

I make the spring H in two sections, $e\ e'$, arranged upon the shank $f$ of the sliding bar, and confined by nuts $g$ between two cups, $h\ h'$. Between the springs I place a washer, $b$, of larger diameter than the springs. The margin of the washer bears against the back wall of the spring-lodge, and receives through the spring the reacting blow of the sliding bar, which thus is always cushioned, so as to prevent the noise from the contact of the bar-shoulder with the socket-piece. The front section, D, of the socket has a shoulder, $i$, near its outer end, for supporting the dash-apron B through an opening, in which the outer end of the socket with its sliding bar projects; and there is another upper opening through the dash-apron, for a purpose described hereinafter.

The sliding bar where it passes through the front section, D, of its socket, is best made in the form of a broad flat bar, a little thinner at each edge, with a gradual taper from the center.

Free working of the draw-head is promoted by having the hook sliding bar extending through the nose-piece K, placed at about the same angle as that of the horse's trace, and closeness of the horse to the car is favored by elevating the draw-head hook.

To prevent escape of horses from the car, a weighted lever, I, is hung to swing freely between lugs $c\ c$ of the sliding bar, the outer or lighter end of the lever closing the mouth of the hook, but yielding to admit the link of the whiffle, the inner end, which is the heavier, then descending by its gravity and again closing the hook's mouth, thus giving free inlet, but rendering impossible any involuntary outlet.

The inner weighted end of the lever I is turned up, to permit the driver to insert beneath it the toe of his boot, to tilt the lever and permit the release of the link.

In coupling horses to the car, especially with pole, and yet more likely with hook draw-head, the horses sometimes rush back, and the butt of the pole strikes and damages the dash-apron. This I remedy by making a shield of size sufficient to cover the part of the dash-apron immediately surrounding the draw-bar head, and with openings $x$ $x$, corresponding to those in the apron for the front end of the socket and its sliding bar and for the lugs and lever, so arranged and adjusted that when the sliding bar, with its lugs and lever, are drawn out by the jerk of the starting horses those parts will have freedom of action while snugly filling, when in back position, the orifices made in the shield and dash-apron, so that there may be no passages for cold winds, rain, or mud.

I claim—

1. A tram-car draw-head with the sliding bar terminating in a hook and behind the hook two lugs to support a lever suspended to make contact at its forward end with the hook, substantially as and for the purpose set forth.

2. A tram-car draw-head with its sliding bar terminating in a hook and behind the hook two lugs holding a lever capable of vibration on its axis, the lighter end making contact with and closing the mouth of the hook, as and for the purpose set forth.

3. A tram-car draw-head with a hook and sliding bar, and a lever with one end closing the mouth of the hook and its opposite end curved upward in a suitable form to receive under it the operating-toe of the boot, as and for the purpose set forth.

4. A tram-car draw-head with the mouth of the draw-head hook closable by a lever having its outer end closing the mouth of the hook and the inner end weighted to hold the hook closed, substantially as and for the purpose set forth.

5. A tram-car draw-head provided with a hook, and with a lever passing through the dash apron, as and for the purpose set forth.

6. A tram-car draw-head constructed with a sliding bar having a flat part passing through the dash, and the front section, D, of the socket placed above the nose-piece, with the central part of the sliding bar through a chamber in the nose-piece, and the shank of the sliding bar, with its spring, in the rear portion of the socket, beneath the nose-piece and the floor of the platform, as and for the purpose set forth.

7. A tram-car with a spring draw-head having its sliding bar front section flat, or nearly so, with hook outer end and a lever closing the mouth of the hook, the front section of the socket on the upper side of the nose-piece, the middle section extending through the nose-piece and platform-floor, and rear section of the socket carrying in its lodge a spring operating as both draw and bumper springs, as and for the purpose set forth.

8. A tram-car with a hook draw-head holding the car-whiffles locked in the hook by a lever closing the mouth of the hook automatically and capable of letting out the whiffles when tilted by the driver's toe raising the inner end, substantially as described.

9. A tram-car with draw-head having its sliding bar recoiled by a spring below the platform-floor, with the head of sliding bar elevated above its floor and the flat section of the bar passing forward through holes in the dasher sufficiently to permit the easy coupling of the poles or whiffles, substantially as described.

10. A tram-car draw-head with the front section of the sliding bar flat and located above the nose-piece, the middle section extending through the nose-piece, and the third or tail section holding the spring below the car-floor, as and for the purpose set forth.

11. A tram-car draw-head with a flat front section of its sliding bar above the platform-floor, and the tail section below the floor, and passing through a spring held in its ledge, and acting as a bumper and draw spring, with an additional draw-spring on the tail of the sliding bar, outside of the socket, as and for the purpose set forth.

In testimony whereof I have signed my name to this specification in the presence of two subscribing witnesses.

JOHN STEPHENSON.

Witnesses:
 Jos. B. STEPHENSON,
 STUART A. STEPHENSON.